United States Patent

Girard et al.

Patent Number: 5,814,963
Date of Patent: Sep. 29, 1998

[54] DEVICE FOR DAMPING THE VIBRATIONS OF A STRUCTURE SUBJECTED TO DYNAMIC STRESSES

[75] Inventors: Laurent Jean Daniel Girard, Marseilles; Thomas Pierre Louis Manfredotti, Eguilles, both of France

[73] Assignee: Eurocopter France, Marignane Cedex, France

[21] Appl. No.: 728,036

[22] Filed: Oct. 9, 1996

[30] Foreign Application Priority Data

Oct. 9, 1995 [FR] France ................................. 95 11851

[51] Int. Cl.⁶ ........................................................ G05B 5/01
[52] U.S. Cl. ............................................. 318/611; 318/460
[58] Field of Search .................................. 318/460, 611; 52/167.1, 167.2, 167.3; 310/15, 16, 17

[56] References Cited

U.S. PATENT DOCUMENTS

| | | | |
|---|---|---|---|
| 4,749,891 | 6/1988 | Sheng ......................................... | 310/15 |
| 4,976,415 | 12/1990 | Murai et al. .............................. | 267/136 |
| 5,022,201 | 6/1991 | Kobori et al. ............................. | 52/167 |
| 5,245,807 | 9/1993 | Ishimaru et al. .......................... | 52/167 |
| 5,410,845 | 5/1995 | Sakamoto et al. ....................... | 52/167.2 |

FOREIGN PATENT DOCUMENTS

| | | |
|---|---|---|
| 0554057 | 8/1993 | European Pat. Off. . |
| 2036979 | 2/1972 | Germany . |

OTHER PUBLICATIONS

Patent Abstracts of Japan, vol. 8, No. 154, p. 1591, Jul.18, 1984, (Japanese M–310).
Patent Abstracts of Japan, vol. 013, No. 033, Jan. 25, 1989 (Japanese M–789).
SU 1467–286–A, Mar. 23, 1989 (SU '286).
Nishimura, Isao, et al., "Active tuned mass damper", *Smart Materials & Structures*, vol. 1, No. 4, Dec. 1, 1992, pp, 306 to 311.
Patent Abstracts of Japan, vol. 9, No. 117, p. 1840, May 22, 1985 (Japanese M–381).

*Primary Examiner*—William M. Shoop, Jr.
*Assistant Examiner*—Kim Lockett
*Attorney, Agent, or Firm*—Fisher,Christen&Sabol

[57] ABSTRACT

The present invention relates to a device (1) for damping the vibrations of a structure (2) subjected to dynamic stresses, of the type including a main mass (3) mounted on an elastic plate (4) which is itself fitted into the structure (2) whose vibrations are to be damped.

According to the invention, the damping device (1) additionally comprises at least one auxiliary mass (5) connected to said main mass (3) and capable of being moved at least substantially parallel to said elastic plate (4) as a function of the control pulses which are received from a computer (9) and are computed from signals output by a first (10) and/or a second accelerometer (11) respectively measuring the vibrations of said structure (2) and those of said main mass (3).

13 Claims, 3 Drawing Sheets

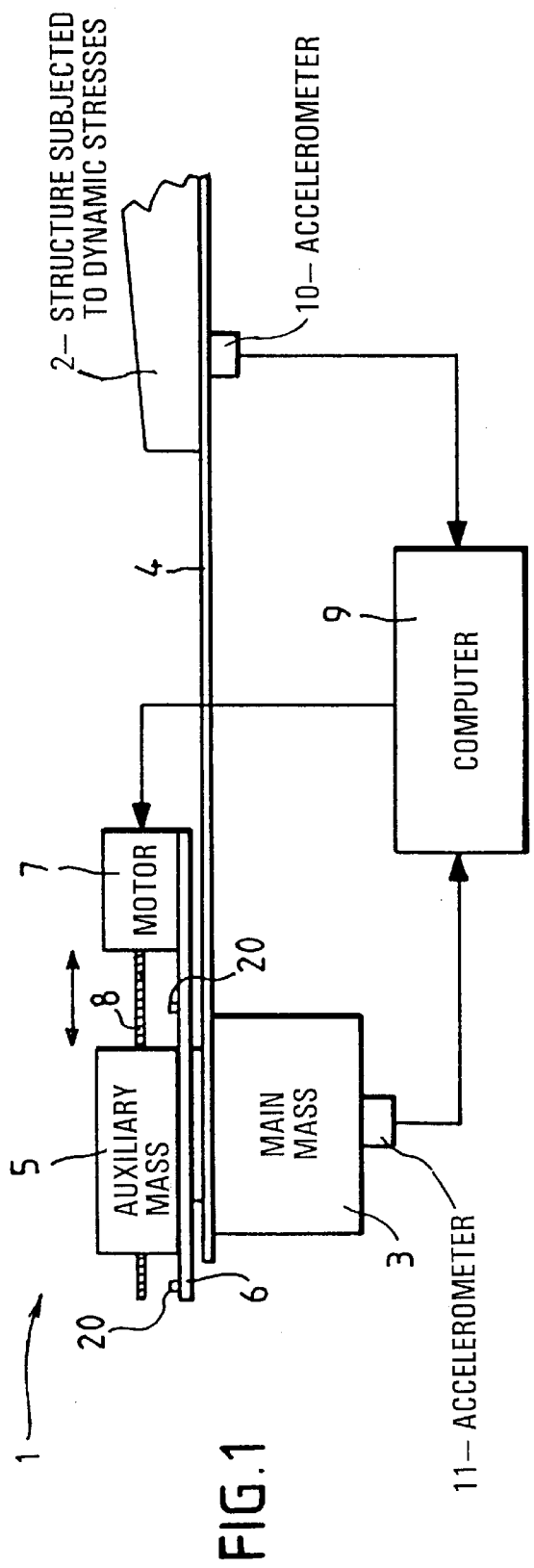
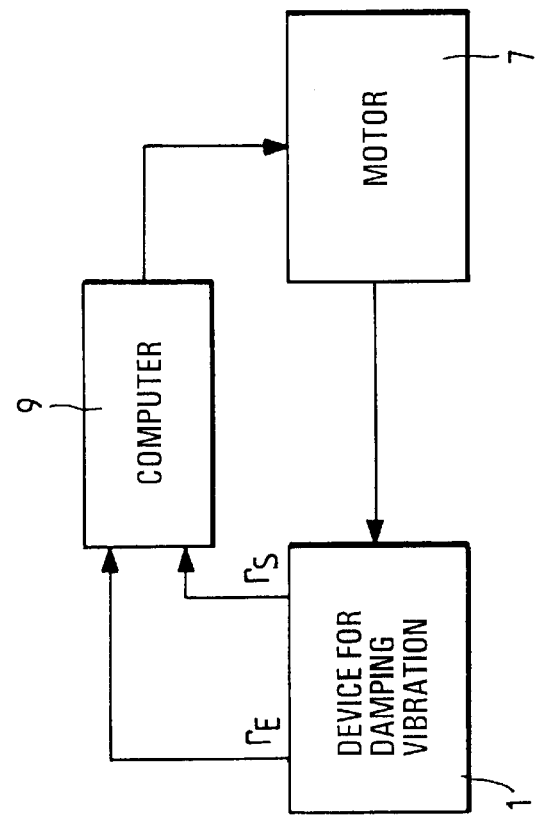
FIG. 1
FIG. 3

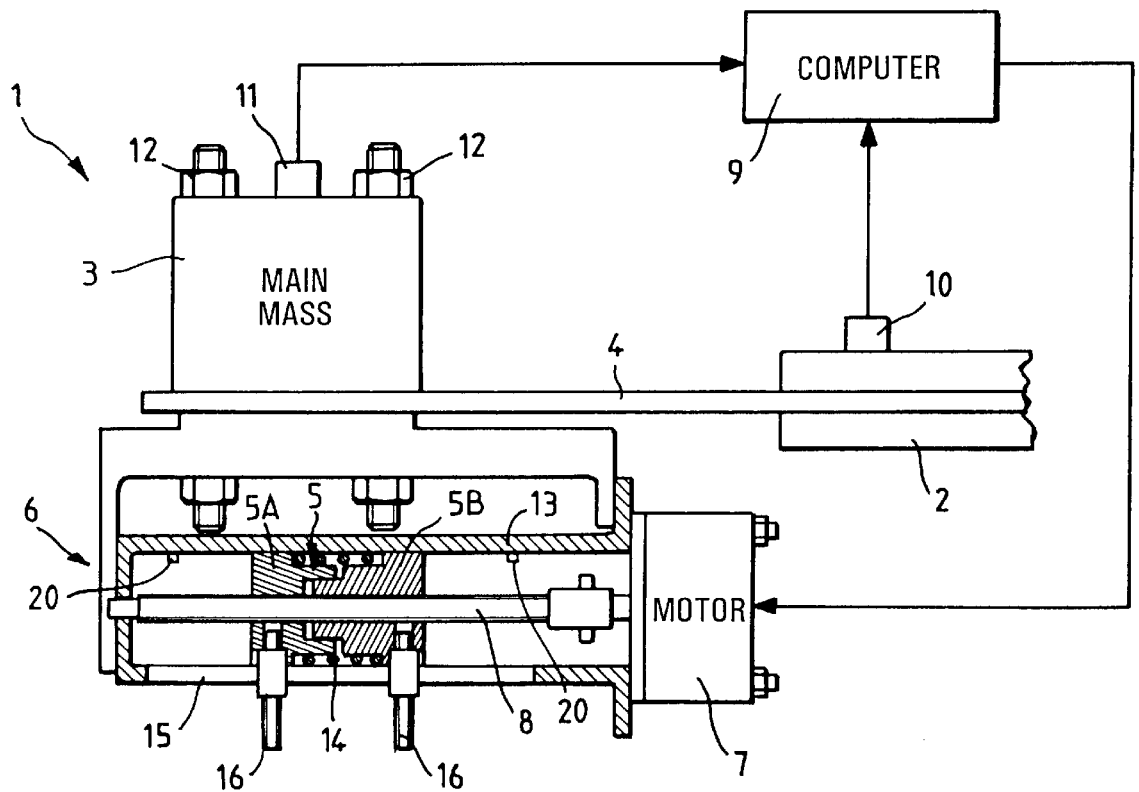
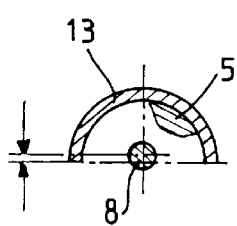
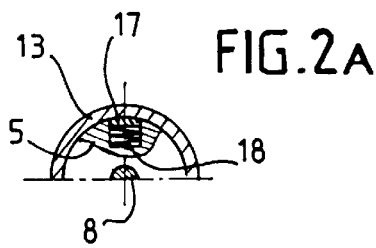
FIG. 2
FIG. 2B
FIG. 2A

DEVICE FOR DAMPING THE VIBRATIONS OF A STRUCTURE SUBJECTED TO DYNAMIC STRESSES

The present invention relates to a device for damping the vibrations of a structure subjected to dynamic stresses.

The present invention applies more particularly, but not exclusively, to the damping of the vibrations of a rotor craft element, in particular the cockpit of a helicopter.

The vibrations of a helicopter element (for example the cockpit) resulting from the alternating aerodynamic loads generated by the blades, are periodic with a fundamental frequency Fe equal to the product of the frequency of rotation of the rotor and the number of blades of the rotor. One of the solutions used on helicopters for attenuating the first harmonic (of frequency Fe) of these vibrations is the provision of a resonator (or dynamic absorption device).

Such a resonator generally consists of a mass mounted on an elastic plate, itself fitted into the structure whose vibrations are to be damped. A resonator of this type is characterized by its natural frequency, denoted F, which depends on:

the value of the mass,
the material of the plate,
the geometry of the plate,
the position of the mass on the plate.

Such a resonator operates as follows. When the structure vibrates (considering only the Fe frequency component of the vibrations), the resonator is excited by the vibrations of the structure. The vibration of the mass, due to the dynamic response of the resonator to the excitations of the structure, then generates a dynamic force (inertial force of frequency equal to the frequency Fe of the vibrations of the structure) which can, depending on the characteristics of the resonator, counter (damp) the vibrations of the structure.

It is shown that the optimum characteristics of the resonator (that is to say the characteristics making it possible to obtain maximum damping of the vibrations of the structure, or maximum vibration of the mass of the resonator) are obtained when the natural frequency F of the resonator is equal to the frequency Fe of the vibrations of the structure which are to be damped. In practice, for a given frequency Fe, the resonator is adjusted by determining, during tests, the optimum position of the mass of the resonator on the elastic plate, namely so that F=Fe.

In the case of a helicopter, in particular, the problems posed by such resonators are as follows:

the mass required on the helicopter is large,
the initial adjustment of such a resonator (determining the position of the mass on the elastic plate) is expensive in terms of testing time,
the resonator may become deadjusted during flight, because of the change in the impedance of the structure over time (aging of the structure, alteration of the structure and change in the loading conditions, which leads to an alteration of the natural frequency F of the resonator),
the initial adjustment of the resonator may no longer be optimum in certain the flight phases, because of the change in the speed of rotation of the rotor in accordance with the flight conditions (the frequency Fe of the excitations is then different than the natural frequency F of the resonator),
the resonator may also become deadjusted during flight because of changes in the level of vibrations of the structure in flight, according to the flight conditions (the natural frequency F of the resonator then becomes different than the frequency Fe of the excitations because it depends on the excitation level), the resonator being a slightly nonlinear mechanical system because it is lightly damped.

The object of the present invention is to overcome these drawbacks.

To this end, the device for damping the vibrations of a structure subjected to dynamic stresses, of the type including a main mass mounted on an elastic plate which is itself fitted into the structure whose vibrations are to be damped, the position of said main mass along said plate being initially adjusted in such a way that the natural frequency of the damping device is equal to the frequency of the vibrations of the structure which are to be damped, is noteworthy, according to the invention in that, in order to match the natural frequency of the damping device continuously to the frequency of the vibrations of the structure which are to be damped, the damping device additionally comprises at least one auxiliary mass connected to said main mass and capable of being moved at least substantially parallel to said elastic plate as a function of the control pulses which are received from a computer and are computed from signals output by at least one of two accelerometers respectively measuring the vibrations of said structure and those of said main mass.

In this way, a damping device (or resonator) is obtained which is capable of automatic self-adjustment, so that it provides its optimum performance at all times. The principle of the invention therefore consists in servo-controlling the position of a part of the mass (auxiliary mass) of the resonator which is used for generating the inertial forces countering the vibrations of the structure, so that the natural frequency F of the generator is equal to the frequency Fe of the excitations at all times.

Advantageously, said auxiliary mass is connected to said main mass by means of a support on which a motor is mounted, this motor being connected to said auxiliary mass by a shaft and receiving said control pulses.

In addition, said auxiliary mass may consist of two masses which are guided axially in a sleeve and are capable of executing a translational movement on said shaft, a prestressed spring being provided between the two said masses in order to eliminate the axial plays.

Moreover, in order to eliminate the axial plays, said auxiliary mass, guided in a sleeve, has a set of contact pads pressed by a spring against the internal face of said sleeve.

Preferably, said shaft is produced in the form of an endless screw rotated by said motor fixed to one end of said sleeve.

In particular, said motor may be an electric stepper motor.

Advantageously, the two said masses are prevented from rotating by means of a longitudinal groove made in said sleeve, and two threaded rods, each fixed in one of said masses, or alternatively by shifting the axis of said screw relative to the longitudinal axis of said sleeve.

Preferably, said support is fixed, on the one hand, to said main mass and to said elastic plate and, on the other hand, to the assembly consisting of said auxiliary mass and said motor.

Moreover, the device may comprise two end-of-travel contacts for the auxiliary mass.

According to other features of the invention, the servo control of the device is an analog or digital type servo control.

In the case of analog servo control:
the signals of the two accelerometers are filtered by a band-pass filter;
the filtered signals are then multiplied in an analog multiplier;

a voltage proportional to the cosine of the phase shift between the two signals is then obtained using a low-pass filter and a dynamic detector of the signal produced; and the motor is controlled using this voltage, the sign of which characterizes the position of the natural frequency of the device relative to the frequency of the vibrations of the structure which are to be damped.

In the case of digital servo control:

after having measured the frequency of the vibrations to be damped, the component at this frequency in the signals of the two accelerometers is extracted digitally; and the displacement of the auxiliary mass is controlled by calculating the phase shift between the harmonics of the signals of the accelerometers, the value of this shift relative to 90° characterizing the position of the natural frequency of the device relative to the frequency of the vibrations of the structure which are to be damped.

The figures of the appended drawing will clearly show how the invention may be embodied. In these figures, identical reference note similar elements.

FIG. 1 is a block diagram of an illustrative embodiment of the damping device according to the invention.

FIG. 2 shows a practical illustrative embodiment of the damping device according to the invention.

FIGS. 2A and 2B illustrate two variants of the embodiment shown in FIG. 2.

FIG. 3 schematically shows the servo-control loop of the device according to the invention.

Figure 4:
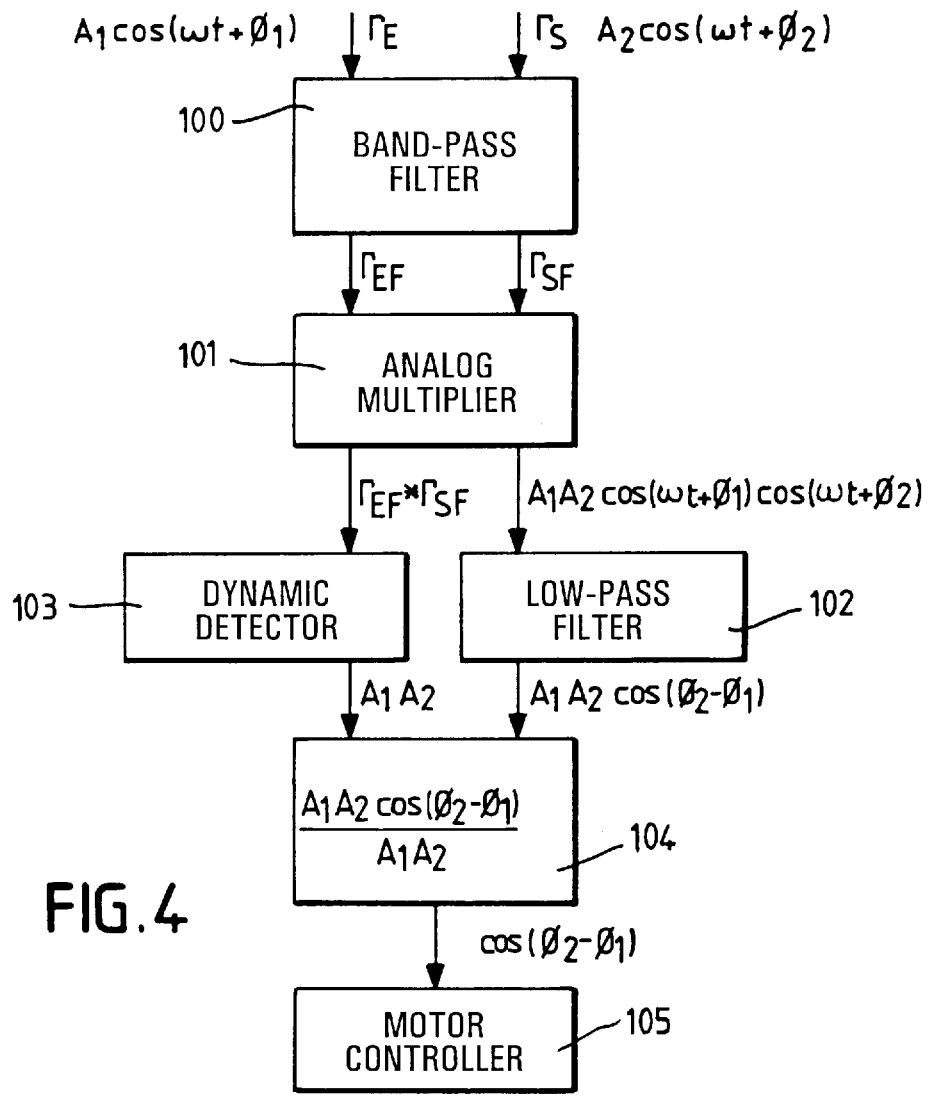

FIG. 4 illustrates the case of analog servo control.

Figure 5:
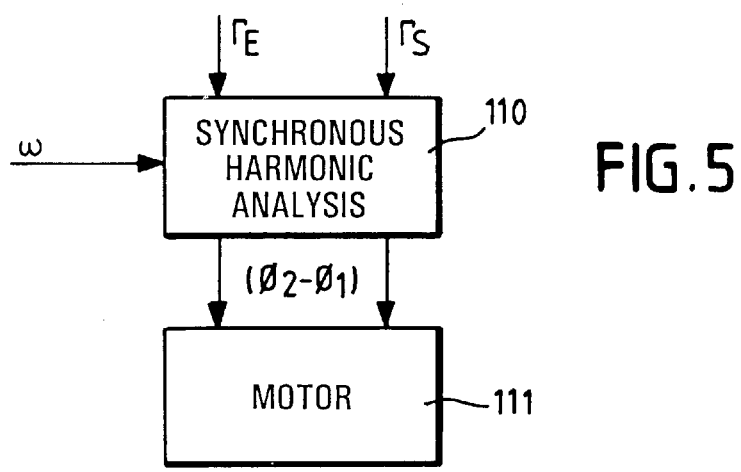

FIG. 5 illustrates the case of digital servo control.

The block diagram in FIG. 1 shows that the device 1 for damping the vibrations of a structure 2 subjected to dynamic stresses comprises, in conventional fashion, a main mass 3 mounted on an elastic plate 4, itself fitted into the structure 2 whose vibrations are to be damped, the position of said main mass 3 along said elastic plate being initially adjusted in such a way that the natural frequency F of the damping device 1 is equal to the frequency Fe of the vibrations of the structure 2 which are to be damped.

According to the invention, in order to match the natural frequency F of the damping device 1 continuously to the frequency Fe of the vibrations of the structure 2 which are to be damped, the damping device 1 additionally comprises an auxiliary mass 5 connected, by means of a support 6, to the main mass 3 and capable of being displaced relative to the elastic plate 4, in particular at least substantially parallel thereto, by a motor 7, in particular an electrical stepper motor or any other means, for example hydraulic, pneumatic or mechanical means, mounted on the support 6 and connected to the auxiliary mass 5 by a shaft 8. The auxiliary mass 8 is displaced (double arrow in FIG. 1) as a function of the control pulses received from a computer 8 and computed from signals output by a first accelerometer 10 and a second accelerometer 11 which respectively measure the vibrations of the structure 2 and those of the main mass 3.

When the frequency Fe of the excitations originating from the structure 2 is equal to the natural frequency F of the damping device 1 (hereafter also referred to as the "resonator"), the latter is then excited at its natural frequency F, that is to say the signals of the first and second accelerometers 10, 11 are thus in phase quadrature. In this case, the resonator is perfectly adjusted and affords optimum performance.

However, when the frequency Fe of the excitations varies by a quantity ΔFe (which variation may, for example, be due to a change in the speed of the rotor), the resonator 1 is no longer excited at its natural frequency F, so that the signals of the accelerometers 10, 11 are no longer in phase quadrature (the resonator is then deadjusted). This is detected by the computer 9, which sends a signal to the motor 7 (which itself controls the position of the auxiliary mass 5 parallel to the plate 4) so as to vary the natural frequency F of the resonator by a quantity equal to ΔFe. The frequency of the excitations originating from the structure 2 is thus equal to the natural frequency of the resonator, and the latter is again correctly adjusted and affords optimum performance.

In addition, when the frequency F (initially equal to the frequency Fe of the excitations) of the resonator varies by a quantity ΔF (which variation may be due to a change in the excitation level or impedance level of the structure, for example), the resonator 1 is no longer excited at its natural frequency, so that the signals of the accelerometers 10, 11 are no longer in phase quadrature (the resonator is deadjusted). This is detected by the computer 9 which then sends a signal to the motor 7 (which itself controls the position of the auxiliary mass 5) so as to vary the natural frequency F+ΔF of the resonator by a quantity which is equal, in absolute terms, to ΔF and is of opposite sign. The natural frequency of the resonator thus again becomes equal to the frequency Fe of the excitations of the structure 2, and the resonator is again correctly adjusted and affords optimum performance.

At all times, this servo-control device thus ensures equality of the frequency Fe of the excitations with the natural frequency F of the resonator, that is to say that, at all times, the resonator is correctly adjusted and provides optimum performance.

The natural frequency range F which the self-adjustable resonator can cover is defined by:

the characteristics of the resonator without servo control (coarse manual adjustment of the position of the main mass 3 on the plate 4), the value of the auxiliary mass 5 and the range of travel of the motor 7, which characteristics should themselves be defined as a function of the possible range of variation of the frequency Fe of the excitations and of the possible range of variation of the natural frequency F of the resonator without servo control.

Two end-of-travel contacts 20 for the auxiliary mass 5 should additionally be provided (FIGS. 1 and 2): these contacts, which are actuated by the auxiliary mass 5, make it possible to stop the motor 7 if the permissible travel is exceeded.

In particular, when the rotor is started, the frequency is very different than the resonant frequency of the device. By virtue of its servo control, this device will try to tune to Fe, which is then outside the maximum range acceptable to the resonator. The auxiliary mass will then reach an end stop, whence the necessity of stopping the motor so that it does not burn out.

Similarly, if there are cracks in the plate 4, the frequency range filterable by the resonator will shift because of the reduction in stiffness of said plate. The resonator will try to adapt until Fe is no longer in the range. This results in the auxiliary mass reaching an end stop. Then, by virtue of the end-of-travel contacts, a warning light may light up on the instrument panel in order to warn the pilot of the anomaly.

The practical illustrative embodiment shown in FIG. 2 generally shows again the elements, listed with reference to FIG. 1, of the device 1 for damping the vibrations of a structure 2 subjected to dynamic stresses, namely:

a main mass 3 mounted on an elastic plate 4 using bolts or the like 12, said plate being itself fitted into the structure 2 (manual displacement of the main mass 3 allows coarse adjustment of the resonator, in similar fashion to a conventional resonator), an auxiliary mass 5 connected, by means of a support 6, to the main mass 3 and capable of being displaced parallel to the elastic plate 4, by a motor 7, on a shaft 8, a computer 9, receiving the signals from a first accelerometer 10 mounted on the structure 2, and from a second accelerometer 11, mounted on the main mass 3 and delivering control pulses to the motor 7.

More particularly, in this case, the auxiliary mass 5 consists of two masses 5A and 5B which are precisely guided axially in the sleeve 13 and are capable of executing a translational movement on the shaft 8 which is produced in the form of an endless screw rotated by the motor 7 fixed on the sleeve 13 at one end thereof. In addition, as shown in FIG. 2A, the auxiliary mass 5 (optionally a single one without a spring 14) guided in the sleeve 13 may, in order to eliminate the radial plays, have contact pads 17 pressed by a spring 18 onto the internal face of the sleeve 13.

A prestressed spring 14 is provided between the masses 5A and 5B in order to eliminate the play between the screw thread of the masses 5A and 5B and the endless screw 8 (within the limit of the prestress), an adjustment lock (not shown) making it possible to adjust the prestress of the spring 14. In addition, the external diameter of the endless screw 8 is a few tenths of a millimeter less than the external diameter of the screw thread of the masses 5A and 5B, in order to make the mounting isostatic, while the two masses 5A and 5B are guided relative to one another by a precise adjustment in order to prevent possible sticking on the screw.

In addition, the masses 5A and 5B are prevented from rotating by a longitudinal groove 15 made in the sleeve 13, and two threaded rods 16 which are each fixed in a mass 5A, 5B, or by shifting the axis of the screw 8, as shown in FIG. 2B (without a groove), relative to the longitudinal axis of the sleeve, whether one or two auxiliary masses 5 are used.

In addition, the support 6 is fixed, on the one hand, to the main mass 3 and the elastic plate 4 by the bolts 12 and, on the other hand, to the assembly consisting of the sleeve 13 and of the motor 7 by bolts or the like, not shown in FIG. 2.

As indicated above, the object of the servo control (FIG. 3) of the resonator 1 according to the invention is to control the electric motor 7, (that is to say the position of the auxiliary mass 5) so as at all times to ensure equality of the natural frequency of the resonator F with the frequency Fe of the excitations (which is equivalent to ensuring, at all times, quadrature of the responses of the two accelerometers 10 and 11). Two types of servo control may be used: analog servo control (FIG. 4) or digital servo control (FIG. 5).

The principle on which the analog servo control is based is illustrated in FIG. 4:

the signals $\Gamma_E(t)$ and $\Gamma_S(t)$ of the two accelerometers 10 and 11 are filtered by a band-pass filter 100 (the frequency range of this filter being the range of possible variation of the frequency Fe of the excitations);

the filtered signals $\Gamma_{EF}(t)$ and $\Gamma_{SF}(t)$ are then multiplied in an analog multiplier 101;

a voltage proportional to the cosine of the phase shift of the two signals $\Gamma_{EF}(t)$ and $\Gamma_{SF}(t)$ is then obtained, using a (static) low-pass filter 102 and a dynamic detector 103 of the product signal $\Gamma_{EF}(t)*\Gamma_{SF}(t)$, at 104; and the motor is finally controlled (at 105) using this voltage, the sign of which characterizes the position of the natural frequency F of the resonator relative to the frequency Fe of the excitations.

The principle on which the digital servo control is based is illustrated in FIG. 5, and requires measurement of the fundamental frequency Fe of the excitations to be damped (in the case of a helicopter, this measurement can be obtained using a phonic wheel or an optical encoder, for example).

With knowledge of the frequency Fe of the vibrations to be damped, it is possible to extract digitally the component at this frequency of the signals $\Gamma_E(t)$ and $\Gamma_S(t)$ of the two accelerometers 10 and 11 (by a synchronous harmonic analysis 110, for example). It is then possible to displace the auxiliary mass 5 using the motor 7 (at 111), having calculated the phase shift between the harmonics of the signals $\Gamma_E(t)$ and $\Gamma_S(t)$, the value of this phase shift relative to 90° characterizing the position of the natural frequency F of the resonator relative to the frequency Fe of the excitations.

In particular in the case of a helicopter, the self-adjustment resonator according to the invention allows, on the one hand, elimination of at least much of the adjustment tests required in the case of a conventional resonator. Furthermore, it makes it possible either to increase the in-flight effectiveness of the resonator (for equal mass) or to reduce the on-board mass of the resonator (for equal effectiveness). In addition, it allows the resonator to be made adaptable to variations in the rotor speed, to changes in the structure and to variations in the vibration level.

We claim:

1. A device (1) for damping the vibrations of a structure (2) subjected to dynamic stresses, of the type including a main mass (3) mounted on an elastic plate (4) which is itself fitted into the structure (2) whose vibrations are to be damped, the position of said main mass (3) along said plate (4) being initially adjusted in such a way that the natural frequency (F) of the damping device (1) is equal to the frequency (Fe) of the vibrations of the structure (2) which are to be damped, wherein, in order to match the natural frequency (F) of the damping device (1) continuously to the frequency (Fe) of the vibrations of the structure (2) which are to be damped, the damping device (1) additionally comprises at least one auxiliary mass (5) guided axially without any radial play in a sleeve (13) connected to said main mass (3) by means of a support (6) and capable of being moved at least substantially parallel to said elastic plate (4) by a motor (7) mounted on said support (6) and receiving control pulses from a computer (9), said control pulses being computed from signals output by at least one of two accelerometers (10, 11) respectively measuring the vibrations of said structure (2) and those of said main mass (3).

2. The device as claimed in claim 1, wherein said auxiliary mass (5) consists of two masses (5A, 5B) which are guided axially in said sleeve (13) and are capable of executing a translational movement on shaft (8) of said motor (7), a prestressed spring (14) being provided between the two said masses (5A, 5B) in order to eliminate the axial plays.

3. The device as claimed in claim 1, wherein, in order to eliminate the radial plays, said auxiliary mass (5), guided in said sleeve (13), has a set of contact pads (17) pressed by a spring (18) against the internal face of said sleeve (13).

4. The device as claimed in claim 2, wherein said shaft (8) is produced in the form of an endless screw rotated by said motor (7) fixed to one end of said sleeve (13).

5. The device as claimed in claim 1, wherein said motor (7) is an electric stepper motor.

6. The device as claimed in claim 2, wherein the two said masses (5A, 5B) are prevented from rotating by means of a longitudinal groove (15) made in said sleeve (13), and two threaded rods (16), each fixed in one of said masses (5A, 5B).

7. The device as claimed in claim 2, wherein the auxiliary mass or masses (5) is or are prevented from rotating by shifting the axis of said screw (8) relative to the longitudinal axis of said sleeve (13).

8. The device as claimed in claim 1, wherein said support (6) is fixed, on the one hand, to said main mass (3) and to said elastic plate (4) and, on the other hand, to the assembly consisting of said auxiliary mass (5) and said motor (7).

9. The device as claimed in claim 1, which comprises two end-of-travel contacts (20) for the auxiliary mass (5).

10. The device as claimed in claim 1, wherein the servo control of said device (1) is an analog-type servo control.

11. The device as claimed in claim 10, wherein, in the case of analog servo control:

the signals of the two accelerometers (10, 11) are filtered by a band-pass filter (100);

the filtered signals are then multiplied in an analog multiplier (101);

a voltage proportional to the cosine of the phase shift between the two signals is then obtained using a low-pass filter (102) and a dynamic detector (103) of the signal produced; and the motor (7) is controlled using this voltage, the sign of which characterizes the position of the natural frequency (F) of the device (1) relative to the frequency (Fe) of the vibrations of the structure (2) which are to be damped.

12. The device as claimed in claim 1, wherein the servo control of said device (1) is digital-type servo control.

13. The device as claimed in claim 12, wherein, in the case of digital servo control:

after having measured the frequency of the vibrations to be damped, the component at this frequency in the signals of the two accelerometers (10, 11) is extracted digitally (110); and the displacement of the auxiliary mass (5) is controlled by calculating the phase shift between the harmonics of the signals of the accelerometers (10, 11), the value of this shift relative to 90° characterizing the position of the natural frequency (F) of the device (1) relative to the frequency (Fe) of the vibrations of the structure (2) which are to be damped.

\* \* \* \* \*